United States Patent
Hayes et al.

(10) Patent No.: US 10,201,940 B2
(45) Date of Patent: Feb. 12, 2019

(54) APPARATUS AND METHOD TO PREDETERMINE A MECHANICAL PROPERTY OF A THREE-DIMENSIONAL OBJECT BUILT BY ADDITIVE MANUFACTURING

(71) Applicant: The Boeing Company, Chicago, IL (US)

(72) Inventors: Michael W. Hayes, Belleville, IL (US); Loren J. Strahm, Glen Carbon, IL (US); Nathanial C. Cuddy, Snohomish, WA (US); Daniel E. Muntges, University City, MO (US)

(73) Assignee: The Boeing Company, Chicago, IL (US)

( * ) Notice: Subject to any disclaimer, the term of this patent is extended or adjusted under 35 U.S.C. 154(b) by 370 days.

(21) Appl. No.: 14/939,336

(22) Filed: Nov. 12, 2015

(65) Prior Publication Data

US 2017/0136703 A1 May 18, 2017

(51) Int. Cl.
*B29C 67/00* (2017.01)
*G05B 19/4099* (2006.01)
(Continued)

(52) U.S. Cl.
CPC ...... *B29C 67/0088* (2013.01); *B29C 67/0092* (2013.01); *B33Y 50/02* (2014.12);
(Continued)

(58) Field of Classification Search
CPC ... B29C 64/386; B29C 67/0088; B33Y 50/00; G05B 19/4099; G05B 2219/35134;
(Continued)

(56) References Cited

U.S. PATENT DOCUMENTS

| 5,121,329 A | 6/1992 | Crump |
| 8,983,643 B2 | 3/2015 | Heide |

(Continued)

FOREIGN PATENT DOCUMENTS

| EP | 1 120 227 A2 | 8/2001 |
| EP | 1 120 227 A3 | 9/2002 |
| WO | 2015/095785 | 6/2015 |

OTHER PUBLICATIONS

European Patent Office, Extended European Search Report, EP 16 18 9076 (dated May 19, 2017).

(Continued)

*Primary Examiner* — Shahed Ahmed
(74) *Attorney, Agent, or Firm* — Walters & Wasylyna LLC

(57) ABSTRACT

A computer implemented apparatus and method for receiving tool paths that a dispensing head follows to deposit roads of material for successively building object layers of a 3D object during an additive manufacturing process, generating simulated object layers of a simulated 3D object from the tool paths, wherein the simulated object layers represent an interior geometry of each one of the object layers, determining a contact surface area between adjacent ones of the simulated object layers, and determining a predicted mechanical property of the 3D object from the contact surface area and a material property of the material.

30 Claims, 11 Drawing Sheets

(51) Int. Cl.
*B33Y 50/02* (2015.01)
*G06F 17/50* (2006.01)

(52) U.S. Cl.
CPC ..... *G05B 19/4099* (2013.01); *G06F 17/5009* (2013.01); *G05B 2219/35134* (2013.01); *G05B 2219/49007* (2013.01); *G06F 2217/12* (2013.01)

(58) Field of Classification Search
CPC ....... G05B 2219/49007; G06F 17/5009; G06F 2217/12
USPC .................................... 700/93, 98, 118, 119
See application file for complete search history.

(56) References Cited

U.S. PATENT DOCUMENTS

| | | | | |
|---|---|---|---|---|
| 2011/0137578 | A1* | 6/2011 | Dietrich | G01N 3/08 |
| | | | | 702/43 |
| 2015/0024233 | A1* | 1/2015 | Gunther | G05B 19/41875 |
| | | | | 428/601 |
| 2017/0225402 | A1* | 8/2017 | Batchelder | B29C 67/0088 |

OTHER PUBLICATIONS

Chakraborty et al: "Extruder path generation for Curved Layer Fused Deposition Modeling", Computer-Aided Design 40 (2008) pp. 235-243.

* cited by examiner

| INTERFACE | ADJACENT PAIR OF TOOL PATH MODEL LAYERS | CONTACT SURFACE AREA | PERCENTAGE | PREDICTED MECHANICAL PROPERTY |
|---|---|---|---|---|
| 1 | 170A - 170B | 198(1) | 212(1) | 214(1) |
| 2 | 170B - 170C | 198(2) | 212(2) | 214(2) |
| 3 | 170C - 170D | 198(3) | 212(3) | 214(3) |
| 4 | 170D - 170E | 198(4) | 212(4) | 214(4) |
| 5 | 170E - 170F | 198(5) | 212(5) | 214(5) |

FIG. 12

APPARATUS AND METHOD TO PREDETERMINE A MECHANICAL PROPERTY OF A THREE-DIMENSIONAL OBJECT BUILT BY ADDITIVE MANUFACTURING

FIELD

The present disclosure is generally related to additive manufacturing and, more particularly, to apparatus and methods to predict mechanical properties of three-dimensional objects built using additive manufacturing processes.

BACKGROUND

Additive manufacturing, also known as 3D printing, is any of various additive processes in which successive layers of material are laid down under computer control to make a three-dimensional object. These objects can be of almost any shape or geometry, and are produced from a 3D model or other electronic data source. One such additive manufacturing process is an extrusion-based additive manufacturing process, also known at fused deposition modeling.

Extrusion-based additive manufacturing works on an "additive" principle by laying down material (e.g., plastic or metal material) in layers to make the object. The object is produced by extruding strings or beads of molten material, which form layers as the material hardens, for example, immediately after extrusion from a nozzle.

Currently, there is no way to reliably predetermine or predict the mechanical properties of an object made by extrusion-based additive processing. Existing analysis software (e.g., finite element analysis software) assesses properties of the exterior of the object. However, in additive processing, the interior of the object can be controlled and plays a key role in the mechanical properties of the object. Thus, every object requires a destructive test in order to verify the mechanical properties (e.g., load carrying capability) of the object.

Accordingly, those skilled in the art continue with research and development efforts in the field of mechanical property analysis of additively manufactured objects.

SUMMARY

In one example, the disclosed method may include the steps of: (1) receiving geometry information associated with tool paths that a dispensing head follows to deposit roads of material for successively building object layers of a 3D object during an additive manufacturing process, (2) generating simulated object layers of a simulated 3D object from the tool paths, wherein the simulated object layers represent an interior geometry of each one of the object layers, (3) determining a contact surface area between adjacent ones of the simulated object layers, and (4) determining a predicted mechanical property of the 3D object from the contact surface area and a material property of the material.

In another example, the disclosed apparatus may include a processor, and a non-transitory memory storing program code executable by the processor, the program code including a simulation module that at least partially generates simulated road data from tool path data, wherein the tool path data includes geometry information associated with tool paths that a dispensing head follows to deposit roads of material for successively building object layers of a 3D object during an additive manufacturing process, and wherein the simulated road data includes simulated object layers representing an interior geometry of each one of the object layers, and an analysis module that generates interface data and that determines predicted mechanical property data of the 3D object from the interface data, wherein the interface data includes a contact surface area between adjacent ones of the simulated object layers and a material property of the material.

In yet another example, the disclosed program product includes a non-transitory computer readable storage medium storing program code executable by a computer to perform the following operations: (1) receive geometry information associated with tool paths that a dispensing head follows to deposit roads of material for successively building object layers of a 3D object during an additive manufacturing process, (2) generate simulated object layers of a simulated 3D object from the tool paths, wherein the simulated object layers represent an interior geometry of each one of the object layers, (3) determine a contact surface area between adjacent ones of the simulated object layers, and (4) determine a predicted mechanical property of the 3D object from the contact surface area and a material property of the material.

Other examples of the disclosed apparatus, method and program product will become apparent from the following detailed description, the accompanying drawings and the appended claims.

BRIEF DESCRIPTION OF THE DRAWINGS

FIG. 12 is an illustration of one example of a graphical display to display results of the analysis operation of FIG. 5;

DETAILED DESCRIPTION

Figure 1:
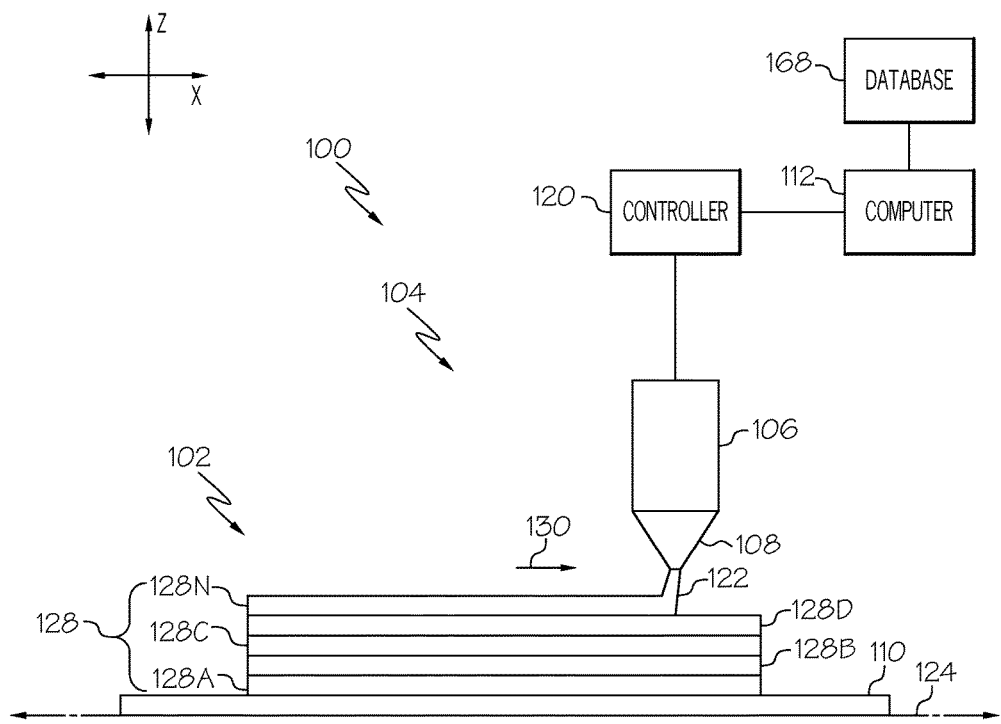
FIG. 1 is a schematic illustration of one example of an additive manufacturing system for building a three-dimensional object.

The following detailed description refers to the accompanying drawings, which illustrate specific examples of embodiments or implementations described in the disclosure. Other examples having different structures and operations do not depart from the scope of the present disclosure. Like reference numerals may refer to the same element or component in the different drawings.

In FIGS. 1, 2, 5 and 15, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples disclosed in the present disclosure. Likewise, elements and/or components, if any, represented with dashed lines, indicate alternative examples of the embodiments or implementations disclosed in the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1, 2, 5 and 15 may be combined in various ways without the need to include other features described in FIGS. 1, 2, 5 and 15, other drawing figures, and/or the accompanying disclosure, even though such combination or combinations are not explicitly illustrated herein. Similarly, additional features not limited to the examples presented, may be combined with some or all of the features shown and described herein.

Figure 4:
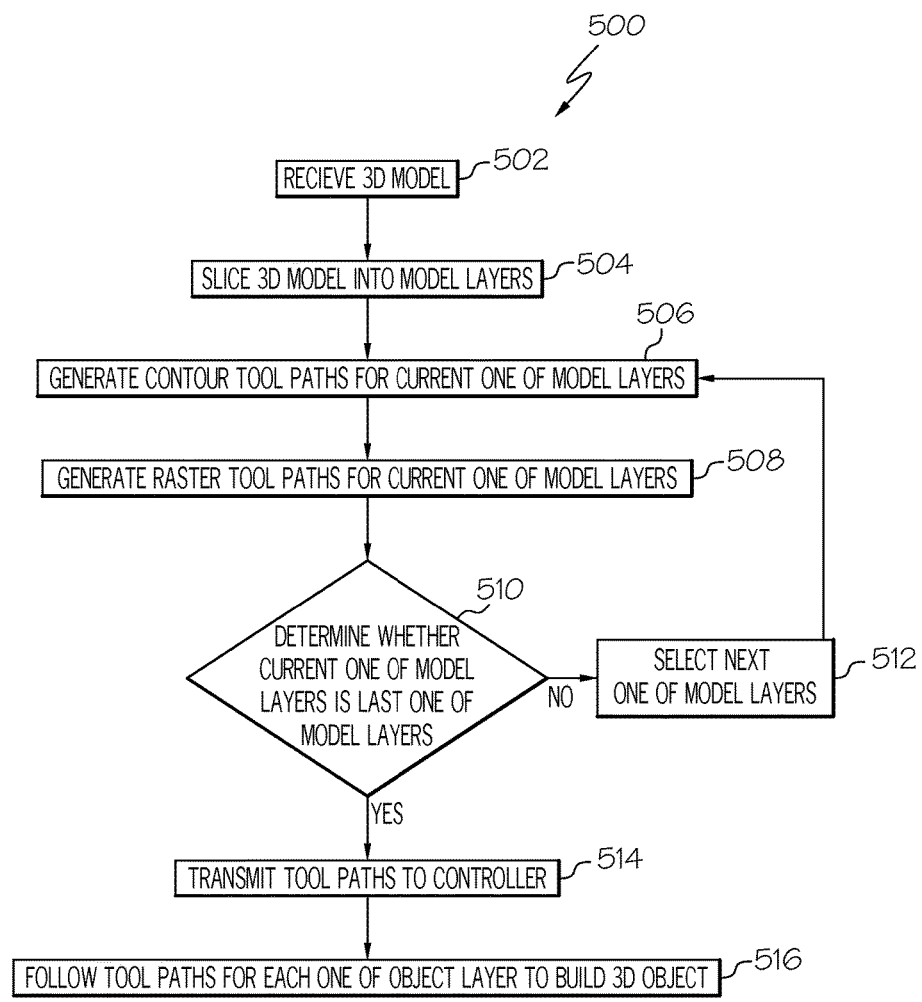
FIG. 4 is a schematic flow diagram of one example of a method for implementing the build operation of FIG. 2.
Figure 13:
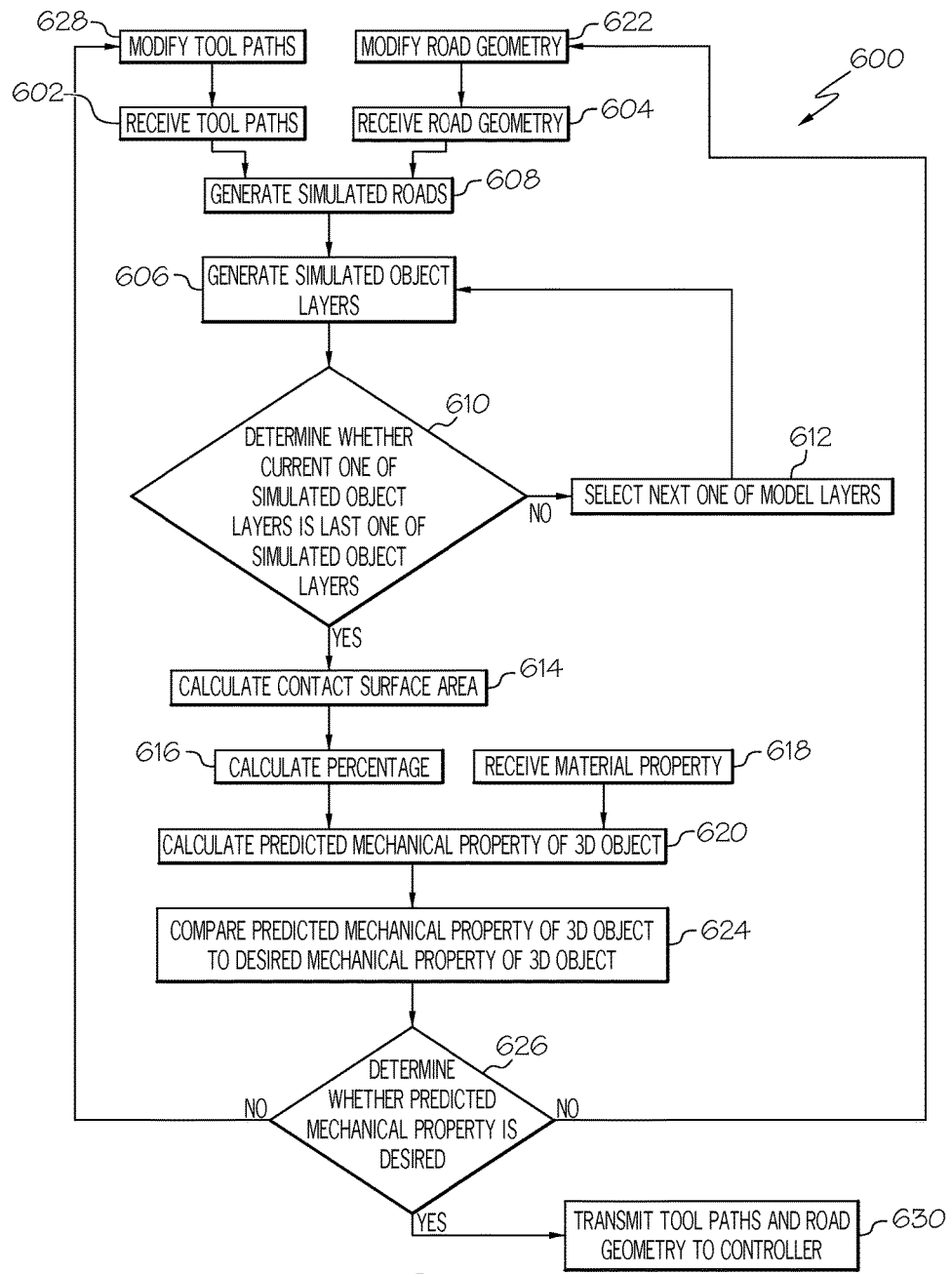
FIG. 13 is a flow diagram of one example of a method for implementing the analysis operation of FIG. 5.
Figure 14:
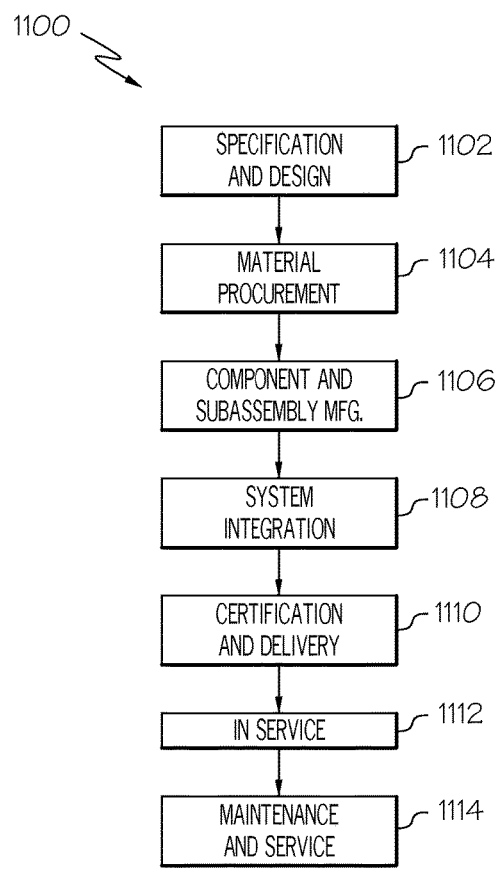
FIG. 14 is a block diagram of aircraft production and service methodology.

In FIGS. 4, 13 and 14, referred to above, the blocks may represent operations, functions, acts, and/or portions thereof and lines connecting the various blocks do not imply any particular order or dependency of the operations or portions thereof. Blocks represented by dashed lines, if any, indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 4, 13 and 14 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. For example, two blocks shown in succession may, in fact, be executed substantially concurrently, or the blocks may sometimes be executed in the reverse order, depending upon the functionality involved. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

Reference herein to "example," "one example," "another example," or similar language means that one or more feature, structure, or characteristic described in connection with the example is included in at least one embodiment or implementation. Thus, the phrases "in one example," "as one example," and similar language throughout the present disclosure may, but do not necessarily, refer to the same example.

Illustrative, non-exhaustive examples, which may be, but are not necessarily, claimed, of the subject matter according the present disclosure are provided below.

Referring to FIG. 1, one example of additive manufacturing ("AM") system 100 is disclosed. AM system 100 may also be referred to as an extrusion-based, deposition-based or layer-based manufacturing system. AM system 100 may be used to build (e.g., make or fabricate) three-dimensional ("3D") object 102 through one or more (e.g., extrusion-based or deposition-based) additive manufacturing processes, also referred to herein as a build operation. As used herein, the terms "three-dimensional object" and "3D object" refer to objects, articles, parts, components and the like built using additive manufacturing processes or techniques, and are not intended to be limited to any particular use. As one non-limiting example, a suitable additive manufacturing process may be fused deposition modeling ("FDM"). AM system 100 may be used during one or more implementations of method 500 (FIG. 4) and/or method 600 (FIG. 13).

Figure 2:
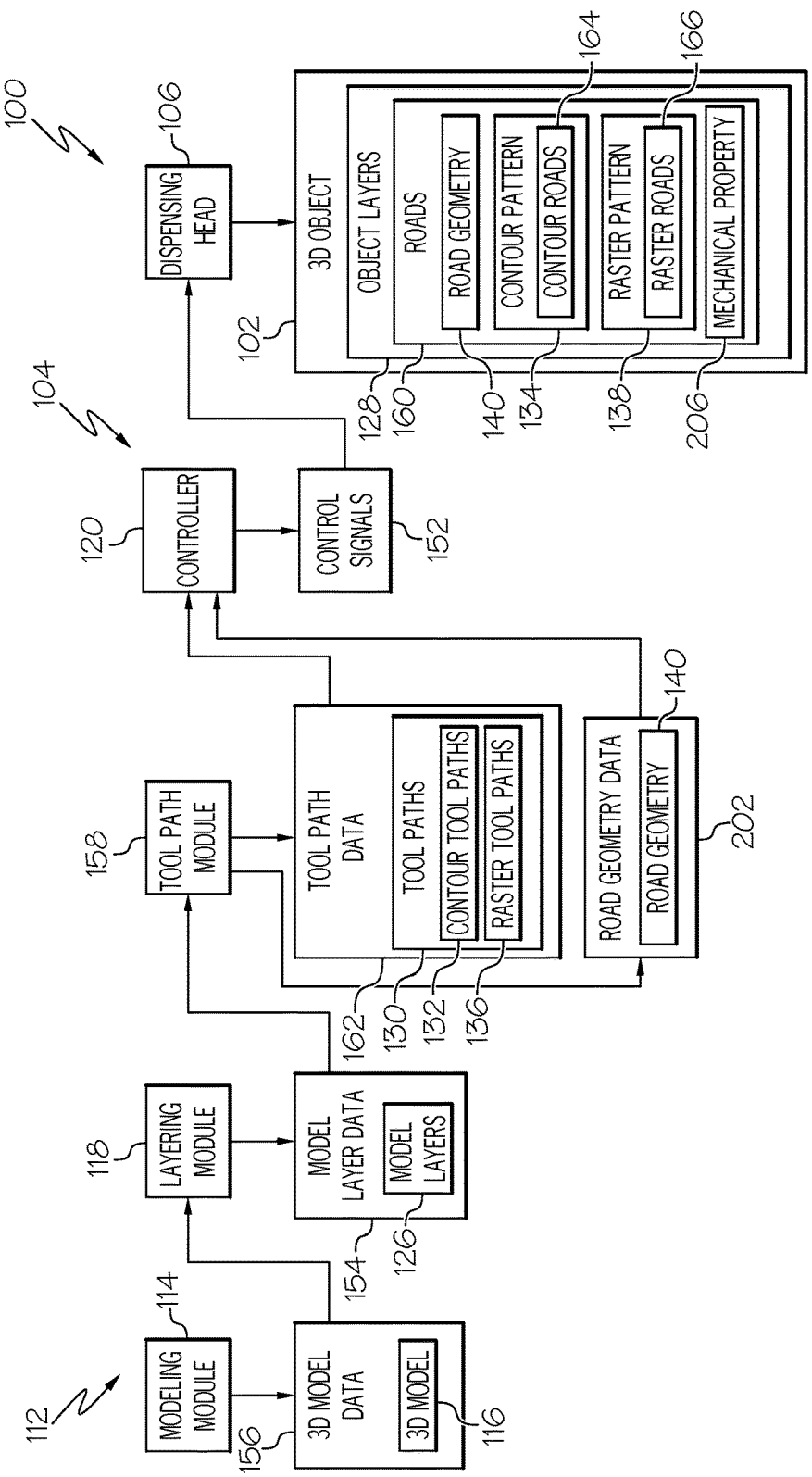
FIG. 2 is a schematic block diagram of one example implementation of a build operation for building the three-dimensional object.

Referring to FIGS. 1 and 2, AM system 100 may include or be used with computer 112. Computer 112 may be one or more computer-based systems that communicate with AM system 100. Computer 112 may be separate from AM system 100, or alternatively may be an internal component of AM system 100. As discussed below, computer 112 may generate data, such as tool path data 162, for building 3D object 102 in a layer-by-layer manner and for predicting one or more mechanical properties of 3D object 102.

Referring to FIG. 1, as one example, AM system 100 includes additive manufacturing ("AM") apparatus 104. AM apparatus 104 may be any suitable system or apparatus for building 3D object 102 through extrusion-based (e.g., layer-based) additive manufacturing. As one specific, non-limiting example, AM apparatus 104 may be a fused deposition modeling system commercially available from Stratasys, Ltd., Eden Prairie, Minn.

AM apparatus 104 may include a movable dispensing head 106 having a discharge (e.g., extrusion) nozzle 108 disposed at a bottom end. Dispensing head 106 may be supported by a mounting arm (not explicitly illustrated). Dispensing head 106 may be located in close proximity to build platform 110 on which 3D object 102 is built up. Build platform 110 may be supported by a base member (not explicitly illustrated).

Dispensing head 106 and/or build platform 110 may be supported (e.g., by the mounting arm and the base member, respectively) for mechanical movement relative to each other, for example, by mechanical drive mechanisms (not explicitly illustrated). In one example arrangement, dispensing head 106 may be fixed relative to base plane 124 and build platform 110 may be configured for translational movement along one or more of an X-axis, a Y-axis and/or a Z-axis relative to base plane 124. In one example arrangement, build platform 110 may be fixed relative to base plane 124 and dispensing head 106 may be configured for translational movement of one or more of the X-axis, the Y-axis and/or the Z-axis relative to base plane 124. Other arrangements may also be used such that one or both of dispensing head 106 and build platform 110 are moveable relative to each other.

Referring to FIG. 2, and with reference to FIG. 1, in one example implantation, AM system 100 may be used to build 3D object 102 using an additive manufacturing process (e.g., the build operation). As one example, AM system 100 is configured for fully automated operation (e.g., computer-controlled). 3D object 102 may be built on build platform 110 by dispensing head 106 in a layer-by-layer manner, based on tool path data 162 generated by computer 112. As one example, 3D object 102 includes multiple object layers 128, identified individually as object layer 128A, 128B, 128C, 128D and 128N in FIG. 1. Each successive one of object layers 128 is built on a preceding one of object layers 128.

Computer 112 may be one or more computer systems that communicate with AM apparatus 104, for example, via controller 120 (e.g., controller 120 communicates with computer 112). Computer 112 may be separate from AM apparatus 104 or may be an internal component of AM apparatus 104.

Referring to FIG. 1, as one example, dispensing head 106 and/or build platform 110 are configured to move relative to base plane 124 (e.g., horizontally in an X-Y plane or vertically along the Z-axis) based on control signals 152 provided from controller 120 (e.g., controller 120 communicates with the mechanical drive mechanisms of dispensing head 106 and/or build platform 110). Base plane 124 is a plane defined by the X-axis and the Y-axis, where the X-axis, the Y-axis, and the Z-axis are orthogonal to each other.

Dispensing head 106 may be configured to deposit build material 122 from a supply source (not explicitly illustrated). Various supply mechanisms (not explicitly illustrated) may be utilized for supplying material 122 to dispensing head 106 and dispending material 122 through nozzle 108. A flow rate of material 122 from dispensing head 106 (e.g., via nozzle 108) may be controlled based on control signals 152 provided from controller 120.

Various types of material 122 in different forms may be used for building 3D object 102 with AM apparatus 104. As one example, material 122 may be one that is thermally solidifiable from a fluid state in which it is applied, either at room temperature or at a predetermined temperature by the use of a cooling medium. Material 122 may be heated to a melting point (e.g., to a predetermined temperature that will exceed its solidification temperature and melt to a flowable, fluid form) in dispensing head 106 and dispensed from nozzle 108 as a flowable fluid. As non-limiting examples, material 122 may be supplied in the form of a solid rod, a wire, a continuous filament and the like. As non-limiting examples, material 122 may include thermoplastics, glass, metals, metal alloys and any combination thereof.

Referring to FIG. 2, and with reference to FIG. 1, in one example implementation, computer 112 may be used to design 3D object 102. As one example, modeling module 114 received or generates (e.g., creates) three-dimensional ("3D") model 116 (e.g., a digital representation of 3D object 102). Modeling module 114 receives or generates (e.g., provides) 3d model data 156 including 3D model 116 and corresponding to (e.g., representing) the particular exterior geometry (e.g., shape) of 3D object 102. As used herein, the terms "three-dimensional model" and "3D model" refer to a digital or virtual representation of objects, articles, parts, components and the like to be built using additive manufacturing techniques. As one example, modeling module 114 may be any suitable computer-aided design ("CAD"), computer-aided manufacturing ("CAM"), or computer-aided engineering ("CAE") software package. As one specific, non-limiting example, modeling module 114 may be software commercially available under the designation "NX" or "NX Unigraphics" from Siemans PLM Software, Plano, Tex.

In one example implementation, 3D model 116 may be inputted to computer 112 utilizing modeling module 114. In one example implementation, 3D model 116 may be generated by computer 112 utilizing modeling module 114. Upon generation or receipt of 3D model 116, computer 112 may reorient 3D model 116 (e.g., relative to base plane 124) for the build operation.

Computer 112 may slice or section 3D model 116 to generate multiple model layers 126 representing corresponding ones of object layers 128. As one example, layering module 118 sections or slices 3D model 116 into multiple model layers 126. Layering module 118 generates (e.g., provides) model layer data 154 including model layers 126 and corresponding to (e.g., representing) the particular exterior geometry (e.g., shape) of each one of object layers 128 of 3D object 102 (e.g., each separate object layer 128') (FIG. 3).

Figure 3:
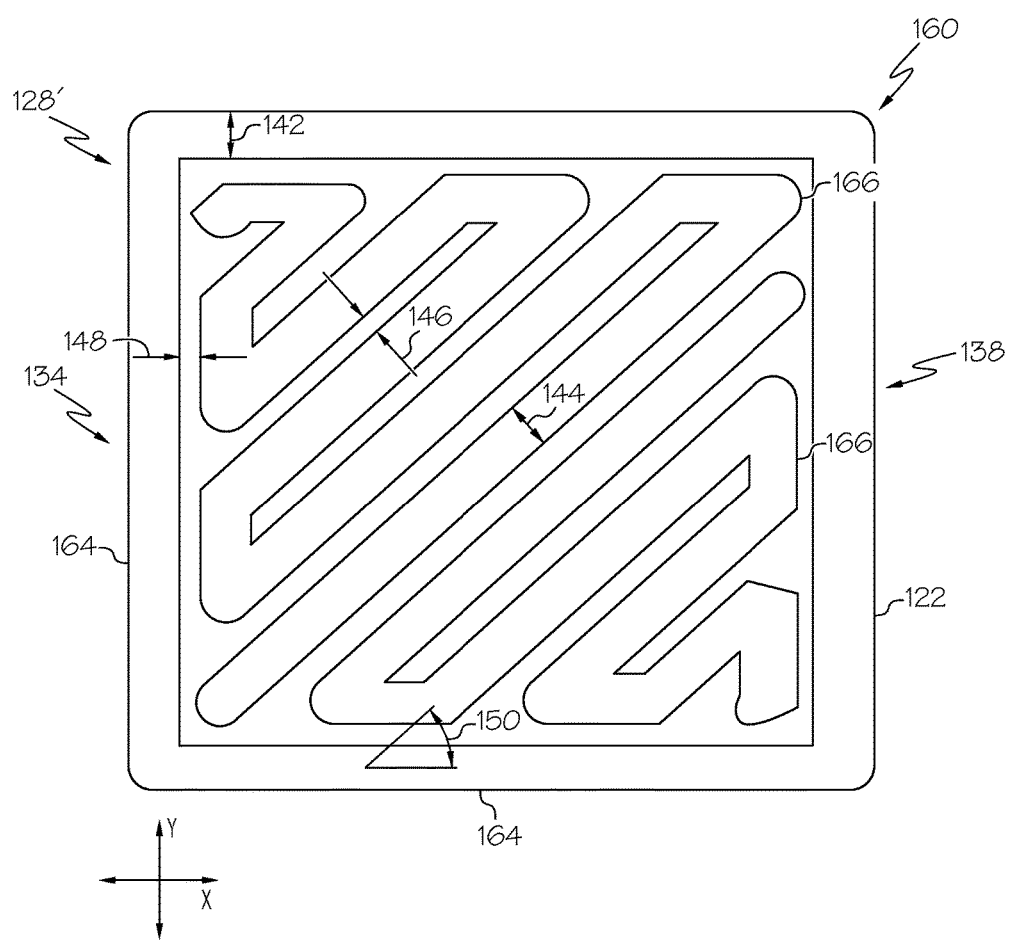
FIG. 3 is a schematic top plan view of one example of an object layer of the three-dimensional object.

Referring to FIG. 2, and with reference to FIG. 3, computer 112 may generate geometry information associated with one or more tool paths 130 for each one of model layers 126 (e.g., each separate model layer). Tool paths 130 are a path through space that dispensing head 106 of AM apparatus 104 follows on its way to building the desired geometry of each one of object layers 128 of 3D object 102. Tool paths 130 correspond to roads 160 (FIG. 4) of deposited material 122 forming each object layer 128' (FIG. 3) (e.g., a given one of object layers 128). As one example, tool path module 158 generates tool path data 162 from model layer data 154 associated with each one of model layers 126. Tool path module 158 generates (e.g., provides) tool path data 162 including tool paths 130. Tool path module 158 also generates (e.g., provides) road geometry data 202 including road geometry 140 and corresponding to (representing) the three-dimensional geometry of roads 160 of material 122 forming each one of object layers 128. Thus, the properties of tool paths 130 and the associated road geometry 140 (e.g., tool path data 162 and road geometry data 202) may be predetermined or pre-generated by tool path module 158. As one specific, non-limiting example, tool path module 158 may be control software commercially available under the designation "Insight" from Stratasys, Ltd. Alternatively, tool path module 158 may comprise a module that is executed or implemented as program code, hardware, or a combination of both, such as a processor that executes program instructions stored on a non-volatile memory coupled to the processor.

Referring to FIG. 3, and with reference to FIG. 2, during the generation of tool paths 130 (e.g., tool path data 162), computer 112 (e.g., tool path module 158) may initially generate one or more contour tool paths 132 that define one or more contour roads 164 of material 122. Contour roads 164 form contour pattern 134 (e.g., a perimeter) of each object layer 128'. Contour roads 164 may be continuous or discontinuous to form contour pattern 134.

Computer 112 (e.g., tool path module 158) may also generate one or more raster tool paths 136 that define one or more raster roads 166 of material 122. Raster roads 166 form raster pattern 138 for each object layer 128' to fill in an interior region defined by contour pattern 134. Raster roads 166 may be continuous or discontinuous to form raster pattern 138.

Computer 112 (e.g., tool path module 158) may generate one or more additional tool paths (not explicitly illustrated) that define one or more additional roads (not explicitly illustrated) of material 122 as necessary to fill in the interior region.

This process may be repeated for each one of model layers 126 of 3D model 116. Some or all of the generated data (e.g., 3D model data 156, model layer data 154, tool path data 162 and road geometry data 202) may be stored on any suitable computer storage medium, such as data storage module 176 (FIG. 5), such as on a storage device of computer 112 or database 168 (FIG. 1).

In some examples, one or more of object layers 128 may have a dense fill pattern (e.g., raster pattern 138) and other ones of object layers 128 may have a sparse fill pattern. The dense fill pattern refers to an interior fill of a given one of object layers 128 in which raster pattern 138 reduces the number of voids within the given one of object layers 128. In comparison, the sparse fill pattern refers to an interior fill of a given one of object layers 128 in which raster pattern 138 creates voids within the given one of object layers 128 to reduce the amount of material 122 required to build the given one of object layers 128.

Referring to FIG. 3, as one example, road geometry 140 (e.g., road geometry data 202) for each one of roads 160 (e.g., contour roads 164 and raster roads 166) associated with each object layer 128' includes, but is not limited to, contour widths 142, raster widths 144, raster-to-raster gap widths 146, contour-to-raster gap widths 148, raster angles 150 and the like. Contour width 142 is a width dimension of material 122 forming each one of contour roads 164. Raster width 144 is a width dimension of material 122 forming each one of raster roads 166. Raster-to-raster gap width 146 is a width dimension of a gap or void disposed between material 122 forming adjacent ones of raster roads 166. Contour-to-raster gap width 148 is a width dimension of a gap or void between material 122 forming adjacent ones of contour roads 164 and ones of raster roads 166. Raster angle 150 is an angular orientation of material 122 forming each one of raster roads 166 relative to one of the X-axis, the Y-axis or one of contour roads 164.

Referring to FIG. 2, and with reference to FIG. 1, as one example, tool path data 162 includes deposition vector or coordinate locations and a deposition timing sequence suitable to form roads 160 of material 122 to build each one of object layers 128. Tool path data 162 and road geometry data 202 are transmitted from computer 112 to controller 120. Controller 120 may utilize (e.g., translate) tool path data 162 and road geometry data 202 to generate control signals 152 (e.g., deposition sequence instructions). Controller 120 in turn is connected to the drive mechanisms for selective movement of dispensing head 106 and/or build platform 110 along tool paths 130 and supply mechanisms for controlled deposition of material 122 by the transmission of control signals 152 to build 3D object 102.

In one example implementation, during the build operation, dispensing head 106 follows tool paths 130 to deposit material 122 and build each one of object layers 128 of 3D object 102. During a material deposition run along tool paths 130 to build each one of object layers 128, the amount of material 122 deposited along tool paths 130 is controlled to achieve the desired road geometry 140, as represented by tool path data 162 and road geometry data 202. As one example, for each one of object layers 128, the build operation generally involves initially depositing contour roads 164 of material 122 to form the perimeters of each one of object layers 128, and then depositing raster roads 166 of material 122 to fill the interior regions of each one of object layers 128. Control signals 152 direct dispensing head 106 to build layers 128A-128N (FIG. 1) sequentially by vertically building successive ones of object layers 128 on top of previously deposited ones of object layers 128.

Referring to FIG. 4, and with reference to FIG. 2, one example of method 500 for building 3D object 102 is disclosed. Method 500 is one example implementation of a build operation that incorporates AM system 100 for generating tool path data 162 for 3D object 102 with computer 112, where tool path data 162 may be subsequently used for building 3D object 102 with AM apparatus 104. Modifications, additions, or omissions may be made to method 500 without departing from the scope of the present disclosure. Method 500 may include more, fewer, or other steps. Additionally, steps may be performed in any suitable order.

As illustrated in FIG. 4, method 500 may initially include the step of receiving, by computer 112, 3D model 116 (e.g., a digital representation of 3D object 102), as shown at block 502. Upon receipt of 3D model 116, computer 112 may reorient 3D model 116 in preparation of the build operation (not explicitly illustrated). Method 500 may include the step of slicing, by computer 112, 3D model 116 into multiple model layers 126, as shown at block 504.

Method 500 may include the step of generating, by computer 112, one or more contour tool paths 132 for a current (e.g., a first) one of model layers 126 (representing one of object layers 128), as shown at block 506. Contour tool paths 132 may be used to form the boundary or boundaries of the current one of object layers 128. In some examples, a given one of object layers 128 may include multiple boundaries for building multiple 3D objects 102 and/or may include an outer boundary and an inner boundary for a single 3D object 102 (e.g., having a hollow interior cavity). Contour tool paths 132 may be generated by computer 112 based on road geometry 140, which is the geometry (e.g., contour width 142) of a deposited contour road 164 of material 122.

Method 500 may include the step of generating, by computer 112, one or more raster tool paths 136 for the current one of model layers 126, as shown at block 508. Raster tool paths 136 may be used to bulk fill the interior region within contour tool paths 132. Raster tool paths 136 may be generated by computer 112 based on road geometry 140, which is the geometry (e.g., raster width 144) of a deposited raster road 166 of material 122.

Figure 10:
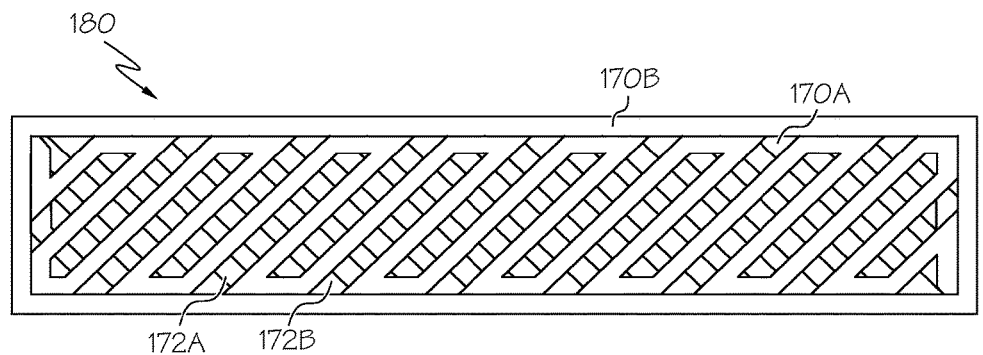
FIG. 10 is a schematic illustration of one example of an interface between adjacent ones of the simulated object layers.

Road geometry 140 may depend on a variety of factors, such as material properties, the type of AM apparatus 104 used, deposition conditions, deposition tip dimensions, and the like. As non-limiting examples, suitable contour widths 142 may range from approximately 0.005 inch (127 micrometers) to approximately 0.5 inch (12.7 millimeters). As non-limiting examples, suitable raster widths 144 may range from approximately 0.005 inch to approximately 0.5 inch. As non-limiting examples, suitable raster-to-raster gap widths 146 may range from approximately 0.0 inch to approximately 5.0 inches (127 millimeters). In certain implementations (not explicitly illustrated), two or more raster roads 166 (e.g., approximately parallel ones of raster roads 166) may be in contact with each other (e.g., touching raster roads 166 for raster-to-raster gap width 146 of approximately 0.0 inch) or there may be some slight thickness overlap along edges of raster roads 166 (e.g., raster roads 166 are pushed together for raster-to-raster gap width 146 of approximately −0.01 inch), such that at least some of raster-to-raster gap widths 146 may be approximately 0.0 inch. As a non-limiting example, a suitable contour-to-raster gap width 148 may be approximately 0.0 inch. As those skilled in the art will recognize, in certain implementations there needs to be at least some connection between at least some contour roads 164 and at least some raster roads 166 (e.g., between an outer mold line of 3D object 102 and interior fill of 3D object 102), for example, as illustrated in FIG. 10. As non-limiting examples, suitable raster angles 150 may range from approximately 0 degrees to approximately 180 degrees. Other examples for road geometry 140 are also contemplated without limitation.

When the current one of model layers 126 is completed, method 500 may include the step of determining, by computer 112, whether the current one of model layers 126 is a last one of model layers 126, as shown at block 510. When the current one of model layers 126 is not the last one of model layers 126, method 500 may include the step of selecting, by computer 112, a next (e.g., a second) one of model layers 126, as shown at block 512. The steps shown at blocks 506 and 508 may be repeated until the last one of model layers 126 is completed. When the last one of model layers 126 is completed, method 500 may include the step of transmitting, by computer 112, the resulting tool paths 130 (e.g., tool path data 162) and road geometry 140 (e.g., road geometry data 202 to controller 120 for building 3D object 102, as shown at block 514.

During the build operation, method 500 may include the step of following, by dispensing head 106, tool paths 130 to form contour pattern 134 and raster pattern 138 for each one of object layers 128 and to build 3D object 102, as shown at block 516. Controller 120 may transmit control signals 152 to dispensing head 106 to control movement of dispensing head 106 along tool paths 130 and deposition of material 122 to form roads 160 for each one of object layers 128.

Referring to FIG. 2, and with reference to FIG. 4, 3D object 102, for example, built in accordance with the build operation illustrated in FIGS. 2 and 4, includes at least one mechanical property 206. As examples, mechanical property 206 may include compressive strength, shear strain, shear strength, tensile strength, yield strength, and the like. Mechanical property 206 of 3D object 102 may depend on various factors, such as material property 184 of material 122, road geometry 140 of roads 160 of material 122, tool paths 130 followed by dispensing head 106 of AM apparatus 104 and the like. In other words, material property 206 depends at least partially on the interior geometry of each one of object layers 128 of 3D object 102.

Figure 5:
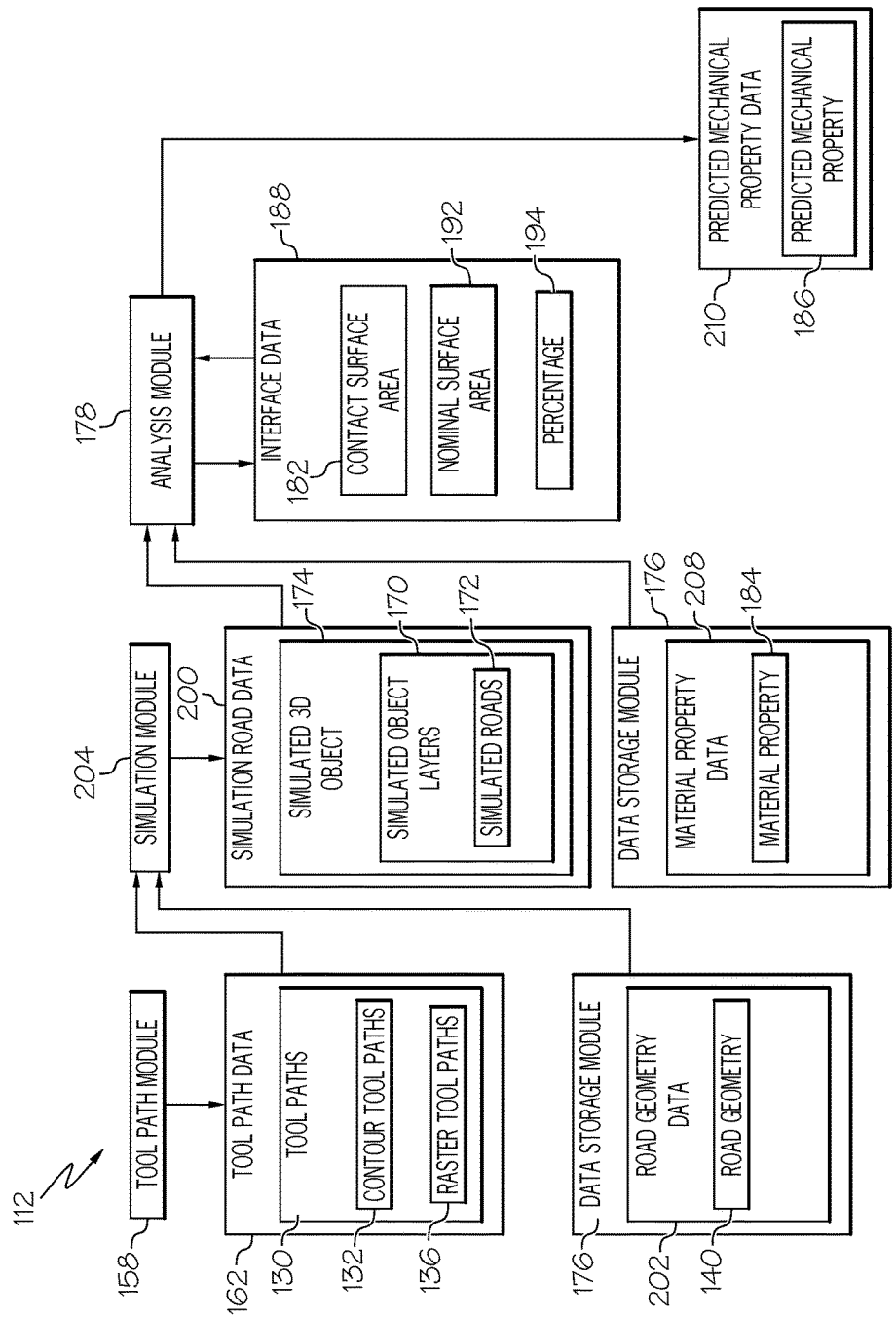
FIG. 5 is a schematic block diagram of one example implementation of an analysis operation for predicting mechanical properties of the three-dimensional object.

Referring to FIG. 5, and with reference to FIG. 1, in one example implementation, AM system 100 may be used to predict mechanical properties of 3D object 102 to be built using an additive manufacturing process, such as the build operation illustrated in FIGS. 2 and 4. Computer 112 may be used to predict one or more mechanical properties of 3D object 102 based on tool path data 162 and road geometry data 202. Computer 112 may extract tool path data 162 and road geometry data 202 (e.g. from tool path module 158 or data storage module 176) and generate simulated object layers 170.

Figure 6:
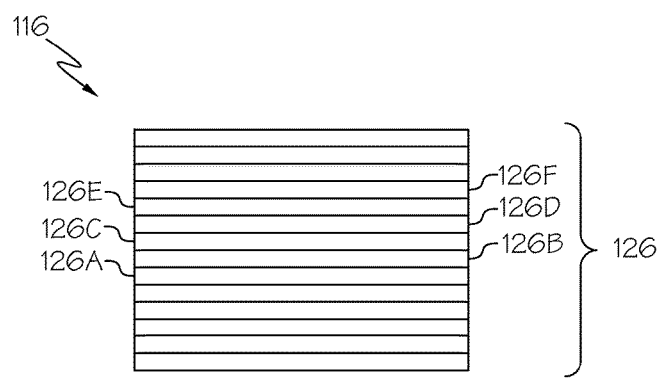
FIG. 6 is a schematic illustration of one example of a three-dimensional model representing the three-dimensional object and sectioned into model layers.

Referring to FIG. 6, and with reference to FIGS. 2 and 5, as one example, 3D model 116 is sliced, for example, by layering module 118 (FIG. 2), into multiple model layers 126. For each one of model layers 126, tool path data 162 may include or provide the X-coordinates and Y-coordinates (e.g., relative to base plane 124) (FIG. 1) for each one of tool paths 130 (e.g., contour tool paths 132 and raster tool paths 136) at a given Z-coordinate (e.g., height relative to base plane 124) and road geometry data 202 may include the three-dimensional geometry of roads 160 of material 122.

Figure 7:
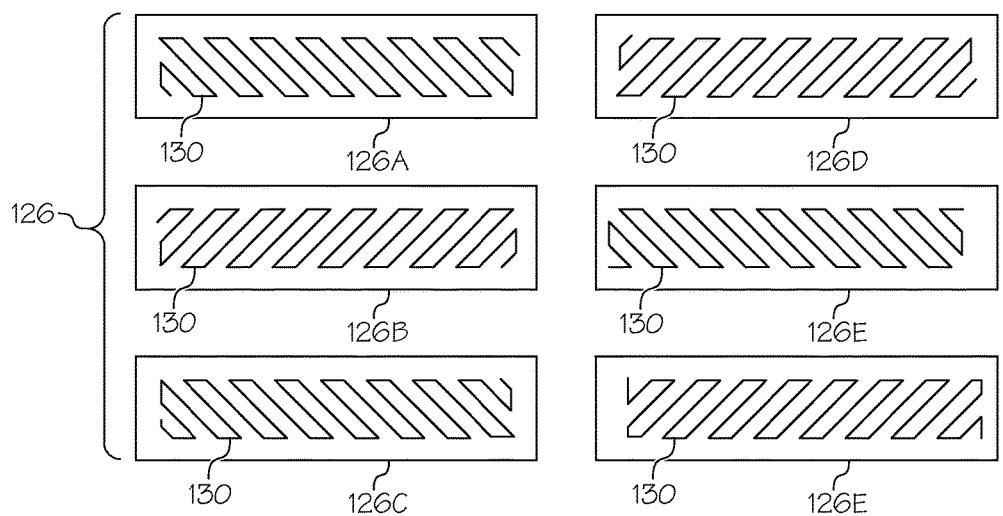
FIG. 7 is a schematic illustration of one example of tool paths of each one of the model layers of the three-dimensional model.

FIG. 7 illustrates a visual representation of tool paths 130 for six model layers 126, identified individually as model layer 126A, 126B, 126C, 126D, 126E and 126F, as provided by tool path data 162. As illustrated, at least a portion of tool paths 130 (e.g., raster tool paths 136) for each one of model layers 126 is different. As examples, a start position or location (e.g., X, Y-coordinate), an end position or location (e.g., X, Y-coordinate) and/or an angular orientation of tool paths 130 may be different between each one of model layers 126. While tool paths 130 for each one of model layers 126 are different in the example illustrated in FIG. 7, in other examples, tool paths 130 for one or more model layers 126 may be the same.

Referring to FIG. 5, and with reference to FIG. 7, in one example implementation, computer 112 generates simulated object layers 170 for simulated 3D object 174. As one example, simulation module 204 uses tool path data 162 and road geometry data 202 from each one of model layers 126 (e.g., generated by tool path module 158) to generate simulated object layers 170 corresponding to (e.g., representing) each one of model layers 126. Simulation module 204 generates (e.g., provides) simulated road data 200 including simulated roads 172 and corresponding to (e.g., representing) road roads 160 (e.g., contour roads 164 and/or raster roads 166) (FIG. 2) for each one of object layers 128 (FIG. 2). As one example, simulation module 204 may be any suitable CAD, CAM, or CAE software package.

Figure 8:
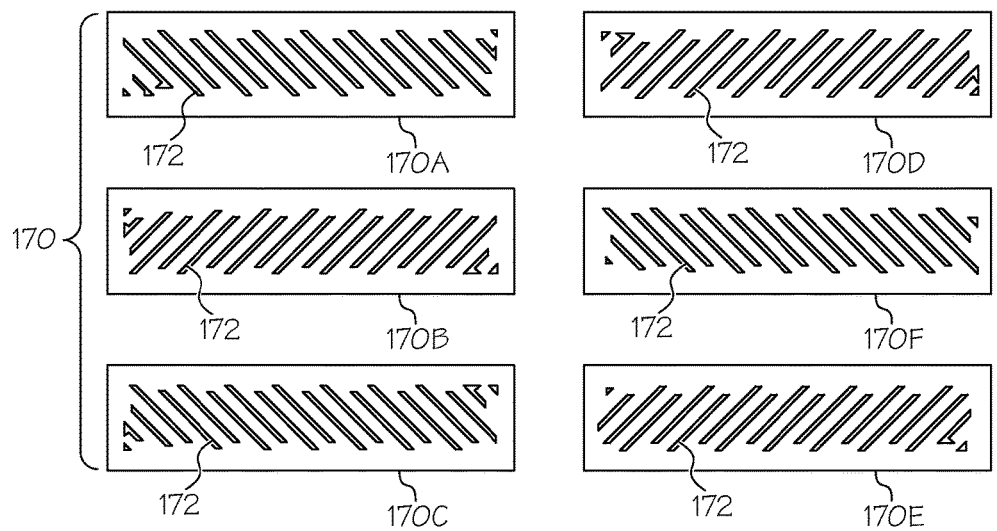
FIG. 8 is a schematic illustration of one example of simulated object layers corresponding to each one of the model layers.

Referring to FIG. 8, using the X,Y-coordinates of tool paths 130 (provided by tool path data 162) and road geometry 140 (provided by road geometry data 202) for each one of model layers 126 as guide lines, simulation module 204 generates simulated roads 172 for each one of simulated object layers 170, identified individually as simulated object layer 170A, 170B, 170C, 170D, 170E and 170F in FIG. 8. In other words, based on tool paths 130 and road geometry 140, simulated roads 172 are generated to form each one of simulated object layers 172 of simulated 3D object 174. As described above, road geometry 140 may depend on various material and/or system factors, such as material properties, the type of AM apparatus 104 used, deposition conditions, deposition tip (e.g., nozzle 108) dimensions, and the like. These material and/or system factors may be known or predetermined values and may be stored in data storage module 176 (e.g., on a storage device of computer 112 or database 168).

As illustrated in FIG. 8, simulated roads 172 of each one of simulated object layers 170 is a digital or virtual representation of roads 160 of material 122 (e.g., raster roads 166 forming raster pattern 138) for each one of object layers 128 (FIG. 2). In some examples, simulation module 204 may simplify tool paths 130 (e.g., model a portion of tool paths 130) of each one of model layers 126 such that simulated roads 172 may be generated representing at least a portion of roads 160 (e.g., raster roads 166) of each one of object layers 128. In other examples, simulation module 204 may model the entirety of tool paths 130 of each one of model layers 126 such that simulated roads 172 may be generated representing the entirety of roads 160 of each one of object layers 128.

Figure 9:
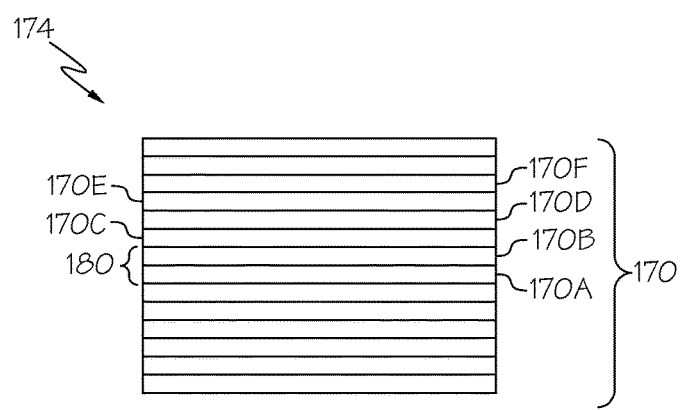
FIG. 9 is a schematic illustration of one example of a simulated three-dimension object built using the simulated object layers.

Referring to FIG. 9, and with reference to FIGS. 6-8, simulation module 204 may reorient (e.g., stack) simulated object layers 170 to generate simulated 3D object 174. The layer-by-layer order of simulated object layers 170 in simulated 3D object 174 is the same as the layer-by-layer order of model layers 126 of 3D model 116 (FIG. 6) representing the layer-by-layer build of object layers 128 of 3D object 102.

Referring to FIG. 5, and with reference to FIGS. 9 and 10, computer 112 may analyze interface 180 between adjacent ones of simulated object layers 170. Interface 180 is a transition area or transition zone between adjacent ones of simulated object layers 170. As one example, analysis module 178 uses simulated road data 200 to determine contact surface area 182 between each adjacent pair of simulated object layers 170 (e.g., between simulated object layer 170A and simulated object layer 170B, between simulated object layer 170B and simulated object layer 170C, between simulated object layer 170C and simulated object layer 170D, etc.) Analysis module 178 uses a calculated contact surface area 182 to determine (e.g., calculate) predicted mechanical property 186 for 3D object 102.

FIG. 10 illustrates one example of adjacent ones of simulated object layers 170 (e.g., simulated object layer 170A and simulated object layer 170B) at interface 180, for example, as generated by simulation module 204. As illustrated in FIG. 10, simulated object layer 170B is overlaid on simulated object layer 170A. As one example, simulated roads 172 of each one of the adjunct ones of simulated object layers 170 (e.g., simulated road 172A of simulated object layer 170A and simulated road 172B of simulated object layer 170B) are different. At interface 180, portions of simulated road 172A and simulated road 172B intersect at multiple intersection areas.

Figure 11:
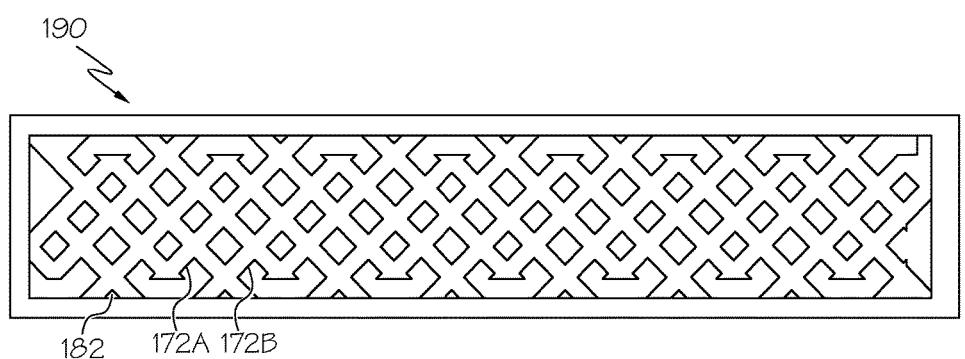
FIG. 11 is a schematic illustration of one example of an interface model representing a contact surface area between simulated roads of the adjacent ones of the simulated object layers.

Referring to FIG. 5, and with reference to FIGS. 10 and 11, based on simulated road data 200 representing each one of simulated roads 172 (e.g., simulated road 172A and simulated road 172B) of each one of the adjacent ones (e.g., adjacent pairs) of simulated object layers 170 (e.g., simulated object layer 170A and simulated object layer 170B), analysis module 178 may execute an intersect function to generate interface data 188. Interface data 188 includes contact surface area 182. That is, the interface function may calculate a total contact surface area 182 between simulated object layer 170A and simulated object layer 170B at interface 180 from simulated road data 200. Contact surface area 182 includes (or is defined by) the intersection area between adjacent ones of simulated roads 172 (e.g., simulated road 172A and simulated road 172B). Thus, the calculated contact surface area 182 between adjacent ones of simulated roads 172 represents the locations where roads 160 of adjacent ones of object layers 128 touch each other during the build operation. In other words, simulated roads 172 of simulated object layers 170 simulate how 3D object 102 is physically built object layer-by-object layer.

FIG. 11 illustrates one example interface model 190 (e.g., a visualization or digital representation of interface 180), for example, as generated by simulation module 204. As illustrated, following execution of the intersect function, only contact surface area 182 between adjacent ones of simulated roads 172 (e.g., the intersection areas between simulated road 172A and simulated road 172B) remains.

Contact surface area 182 between adjacent ones of simulated object layers 170 is a total area of intersection between simulated roads 172 and represents the contact surface area (e.g., a total area of intersection) between roads 160 (e.g., raster roads 166) of adjacent ones of object layers 128 built during the build operation (FIG. 2). Thus, contact surface area 182 between any adjacent pair of simulated object layers 170 represents the load carrying surface area between a corresponding adjacent pair of object layers 128 of 3D object 102.

Referring to FIG. 5, in one example implementation, computer 112 (e.g., analysis module 178) may generate predicted mechanical property data 210 from interface data 188 and material property data 208. As one example, analysis module 178 determines (e.g., calculate) predicted mechanical property 186 of 3D object 102 using contact surface area 182 at each interface 180 and material property 184 of material 122 (FIG. 1).

Material property data 208 includes material property 184 for material 122. Material property 184 may include any suitable bulk material property for the particular type of material 122 used by AM apparatus 104 to build 3D object 102. Material property 184 may be known or predetermined values and may be stored in data storage module 176 (e.g., on a storage device of computer 112 or database 168). Analysis module 178 may receive or extract material property data 208, for example, from data storage module 176. Material property 184 may depend on various factors, such as the type of material 122, the type of AM apparatus 104 used, road geometry 140, and the like. As examples, material properties 184 may include compressive strength, shear strain, shear strength, tensile strength, yield strength and the like.

For each interface 180 between adjacent ones of simulated object layers 170, analysis module 178 also determines (e.g., calculates) nominal surface area 192 between the adjacent ones of simulated object layers 170. Interface data 188 includes nominal surface area 192. Nominal surface area 192 is the total surface area of each one of simulated object layers 170 (e.g., of interface 180 between the adjacent ones of simulated object layers 170).

During the analysis operation, analysis module 178 calculates percentage 194 of the total surface area between adjacent ones of simulated object layers 170 represented by the intersection area between intersecting ones of simulated roads 172 (e.g., a numerical value of contact surface area 182/a numerical value of nominal surface area 192). Interface data 188 includes percentage 194.

Analysis module 178 generates predicted mechanical property data 210 for each interface 180 from interface data 188. As one example, analysis module 178 calculates predicted mechanical property 186 at each interface 180 as a product of percentage 194 and material property 184 (e.g., a numerical value of percentage 194 X a numerical value of material property 184). In other words, computer 112 (e.g., analysis module 178) applies material property 184 at locations where roads 160 of material 122 of adjacent object layers 128 touch each other (e.g., at contact surface area 182). Thus, an overall predicted mechanical property 186 of 3D object 102 is based on at least one predicted mechanical property 186 of at least one interface 180 between at least one adjacent pair of simulated object layers 170. As one specific, non-limiting example, the smallest predicted mechanical property 186 at a given interface 180 may represent the overall predicted mechanical property 186 of 3D object 102 (e.g., where 3D object 102 may fail).

The particular predicted mechanical property 186 may depend upon various factors such as the particular material property 184 used. As examples, predicted mechanical property 186 may include compressive strength, shear strain, shear strength, tensile strength, yield strength, and the like. Predicted mechanical property 186 may also depend upon the characteristics (e.g., geometry, pattern, etc.) of simulated roads 172 that define contact surface area 182.

FIG. 12 illustrates one example of graphical display 196 displaying the results of the analysis operation illustrated in FIG. 5. As illustrated, in one example, graphical display 196 may take the form of a table displaying the adjacent pair of simulated object layers 170, contact surface area 182, percentage 194, and predicted mechanical property 186 at each interface 180. As one example, each interface 180 may be given a numerical identifier (e.g., 1-5). Contact surface area 182 may be displayed as numerical value 198 (e.g., measured in square inches) associated with each interface 180. Percentage 194 may be displayed as numerical value 212 associated with each interface 180. Predicted mechanical property 186 may be displayed as numerical value 214 (e.g., measured in pounds per square inch) associated with each interface 180.

Referring to FIG. 13, and with reference to FIG. 5, one example of method 600 for predicting mechanical property 186 of 3D object 102 is disclosed. Method 600 is one example implementation of an analysis operation that incorporates AM system 100 for generating interface data 188 representing interface 180 between adjacent object layers 128 of 3D object 102 with computer 112, where interface data 188 may be subsequently used for generating predicted mechanical property data 210 and predicting mechanical properties of 3D object 102 to be built using AM system 100. Modifications, additions, or omissions may be made to method 600 without departing from the scope of the present disclosure. Method 600 may include more, fewer, or other steps. Additionally, steps may be performed in any suitable order.

As illustrated in FIG. 13, method 600 may initially include the step of receiving, by computer 112, tool paths 130 for each one of model layers 126 at computer 112, as shown at block 602. Method 600 may include the step of receiving, by computer 112, road geometry 140, as shown at block 604.

Method 600 may include the step of generating, by computer 112 (e.g., simulation module 204), simulated roads 172 representing roads 160 of material 122, as shown at block 608. Method 600 may include the step of generating, by computer 112, simulated object layers 170 representing each one of object layers 128 and corresponding each one of model layers 126, as shown at block 606. Simulated roads 172 are used to build a current (e.g., first) one of simulated object layers 170 corresponding to a current (e.g., first) one of model layers 126. Thus, each one of simulated object layers 170 includes simulated roads 172 corresponding to tool paths 130 of each one of model layers 126 and representing roads 160 of material 122 of each one of object layers 128. In other words, simulated roads 172 digitally or virtually represent the physical roads 160 of material 122 that are deposited by dispensing head 106 of AM apparatus 104 following tool paths 130 to build up each one of object layers 128 of 3D object 102. Thus, computer 112 generates simulated roads 172 (e.g., simulated road data 200) having a geometry defined by or based upon road geometry 140 of roads 160 and tool paths 130.

When the current one of simulated object layers 170 is completed, method 600 may include the step of determining, by computer 112, whether the current one of simulated object layers 170 is a last one of simulated object layers 170 corresponding to the last one of model layers 126, as shown at block 610. When the current one of simulated object layers 170 is not the last one of simulated object layers 170, method 600 may include the step of selecting, by computer 112, a next (e.g., second) one of model layers 126, as shown at block 612. The steps shown at blocks 608 and 606 may be repeated until the last one of simulated object layers 170 corresponding to the last one of model layers 126 is completed.

When the last one of simulated object layers 170 is completed, method 600 may include the step of receiving, by computer 112 (e.g., analysis module 178), simulated roads 172 for each one of simulated object layers 170 (not explicitly illustrated). As one example, analysis module 178 may extract simulated road data 200.

Method 600 may include the step of determining (e.g., calculating) contact surface area 182 between adjacent ones of simulated object layers 170 at each interface 180, as shown at block 614. Method 600 may then include the step of determining percentage 194 of nominal surface area 192 defined by nominal surface area 192, as shown at block 616.

Method 600 may include the step of receiving, by computer 112, material property 184 corresponding to material 122 to be used to build 3D object 102, as shown at block 618.

Method 600 may then include the step of determining (e.g., calculating) predicted mechanical property 186 using percentage 194 and material property 184, as shown at block 620.

Referring to FIG. 5, as previously described, the generated (e.g., calculated) contact surface area 182 at least partially depends upon tool paths 130 and road geometry 140, as expressed by simulated road data 200. As such, the calculated predicted mechanical property 186 for 3D object 102 similarly at least partially depends upon tool paths 130 and road geometry 140. Accordingly, mechanical property 206 for 3D object 102 designed and built using AM system 100 (e.g., the build operation illustrated in FIGS. 2 and 4) may be modified by modifying at least one of tool paths 130 and/or road geometry 140 of roads 160 of one or more object layer 128 of 3D object 102. The disclosed methods (e.g., method 600) (FIG. 13) may further include a computer (e.g., computer 112) (FIG. 1) generating an output including modified tool paths for an additive manufacturing apparatus (e.g., AM apparatus 104) (FIG. 1) that deposits material (e.g., material 122) (FIG. 1) according to modified tool paths to produce a 3D object (e.g., 3D object 102) (FIG. 1) having the mechanical property.

Referring to FIG. 13, in one example implementation, method 600 may also include the step of comparing predicted mechanical property 186 to a desired mechanical property (e.g., mechanical property 206) of 3D object 102, as shown at block 624. Method 600 may then include the step of determining, by computer 112, whether predicted mechanical property 186 is desirable (e.g., a desired mechanical property 206) for the particular application of 3D object 102, as shown at block 626.

When predicted mechanical property 186 is not desirable, method 600 may also include the step of modifying road geometry 140 of roads 160 (e.g., contour roads 164 and/or raster roads 166) of deposited material 122 used to build one or more of object layers 128, as shown at block 624. As examples, modified road geometry 140 may include a modification or variation of one or more of contour widths 142, raster widths 144, raster-to-raster gap widths 146, contour-to-raster gap widths 148, raster angles 150 of raster roads 166 and/or contour roads 164 of one or more object layers 128. Upon receipt of modified road geometry 140 (block 604), the steps shown at blocks 606, 608, 610, 612, 614, 616, 618, 620, 624 and 626 may be repeated to calculate modified predicted mechanical property 186 of 3D object 102.

Alternatively or additionally, when predicted mechanical property 186 is not desirable, method 600 may also include the step of modifying tool paths 130 used to build one or more of object layers 128, as shown at block 628. Upon receipt of modified tool paths 130 (block 602), the steps shown at blocks 606, 608, 610, 612, 614, 616, 618, 620, 624 and 626 may be repeated to calculate modified predicted mechanical property 186 of 3D object 102.

When predicted mechanical property 186 is desirable (e.g., meets or exceeds a desired mechanical property 206 of 3D object 102), tool paths 130 (e.g., tool path data 162) and road geometry 140 (e.g., road geometry data 202) may be transmitted to controller 120, as shown at block 630. Controller 120 may transmit control signals 152 to dispensing head 106 to control movement of dispensing head 106 along tool paths 130 and deposition of material 122 to form roads 160 for each one of object layers 128, as illustrated in FIGS. 2 and 4.

Referring to FIG. 2 and with reference to FIG. 5, modified road geometry 140 and/or tool paths 130 may be provided to computer 112 (e.g., simulation module 204) and used to generate simulated roads 172 for one or more simulated object layers 170 of simulated 3D object 174 (e.g., as generated simulated road data 200). As such, modified simulated roads 172 may be used by computer 112 (e.g., analysis module 178) to calculate modified contact surface area 182 between adjacent ones of modified simulated object layers 170 and calculate modified predicted mechanical property 186. This process may be repeated as necessary to achieve the desired mechanical property 206 of 3D object 102.

Upon determining a particular (e.g., desired) predicted mechanical property 186 based on modified simulated roads 172, tool paths 130 and/or road geometry 140 corresponding to simulated roads 172 (e.g., simulated road data 200 may be incorporated into tool path data 162) during the build operation to build 3D object 102 having desired mechanical property 206.

Accordingly, the disclosed AM system 100 and analysis method 600 may beneficially allow improvement in the assessment of mechanical properties on 3D objects manufactured using an additive manufacturing process prior to being built. Additionally, through iterative modification and analysis of tool path simulations, specific material properties may be achieved. As such, weight, cost and/or function of 3D object may be optimized through iterative design and analysis without the cost and time associated with destructive testing.

The preceding subject matter characterizes various examples of embodiments or implementations disclosed in present disclosure. Each example also includes the subject matter of each other example.

As will be appreciated by one skilled in the art, the examples described herein may be embodied or implemented as apparatus, method or program product. Accordingly, the examples may take the form of an entirely hardware embodiment, an entirely software embodiment (e.g., including firmware, resident software, micro-code, etc.) or an embodiment combining software and hardware aspects that may all generally be referred to herein as a "circuit," "module," or "system." Furthermore, the examples may take the form of a program product embodied in one or more computer readable storage devices storing program code. The storage devices may be tangible, non-transitory, and/or non-transmission.

Many of the functional units described in the present disclosure have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable program code and/or software for execution by various types of processors. An identified module of program code may, for instance, include one or more physical or logical blocks of executable code, which may, for example, be organized as an object, procedure, or function. Nevertheless, the executables of an identified module need not be physically located together, but may include disparate instructions stored in different locations which, when joined logically together, form the module and achieve the stated purpose for the module.

As one example, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium.

The computer readable medium may be a tangible computer readable storage medium. The computer readable storage medium may be a storage device storing the computer readable program code. As examples, the storage device may be, but is not limited to, an electronic, magnetic, optical, electromagnetic, infrared, holographic, micromechanical, or semiconductor system, apparatus, or device, or any suitable combination thereof.

More specific examples of the computer readable storage medium (e.g., storage device) may include, but are not limited to, an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), a digital versatile disc ("DVD"), an optical storage device, a magnetic storage device, a holographic storage medium, a micromechanical storage device, or any suitable combination thereof. In the context of the present disclosure, a computer readable storage medium may be any tangible medium that can contain and/or store computer readable program code for use by and/or in connection with an instruction execution system, apparatus, or device (e.g., a processor).

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency ("RF"), or the like, or any suitable combination thereof.

The computer readable medium may also be a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the disclosed examples may be written in any combination of one or more programming languages, including an object oriented programming language such as Java, Smalltalk, C++ or the like and conventional procedural programming languages, such as the "C" programming language or similar programming languages. The computer readable program code may execute entirely on a local computer, partly on the local computer, as a stand-alone software package, partly on the local computer and partly on a remote computer or server, or entirely on the remote computer or server. In the latter scenario, the remote computer or server may be connected to the local computer through any type of network, including a local area network ("LAN") or a wide area network ("WAN"), or the connection may be made to an external computer (for example, through the Internet using an Internet Service Provider).

The examples may be described herein with reference to schematic flowchart diagrams and/or schematic block diagrams of systems, apparatuses, methods, and/or computer program products. It will be understood that each block of the schematic flowchart diagrams and/or schematic block diagrams, and combinations of blocks in the schematic flowchart diagrams and/or schematic block diagrams, can be implemented by computer readable program code. These program code may be provided to a processor of a general purpose computer, special purpose computer, or other programmable data processing apparatus to produce a machine, such that the instructions, which execute via the processor of the computer or other programmable data processing apparatus, create means for implementing the functions and/or acts specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code, which execute on the computer or other programmable apparatus, provide processes for implementing the functions and/or acts specified in the flowchart and/or block diagram block or blocks.

The schematic flowchart diagrams and/or schematic block diagrams in the Figures illustrate the architecture, functionality, and operation of possible implementations of systems, apparatuses, methods and program products according to various examples. In this regard, each block in the schematic flowchart diagrams and/or schematic block diagrams may represent a module, segment, or portion of code, which includes one or more executable instructions of the program code for implementing the specified logical function(s).

Figure 15:
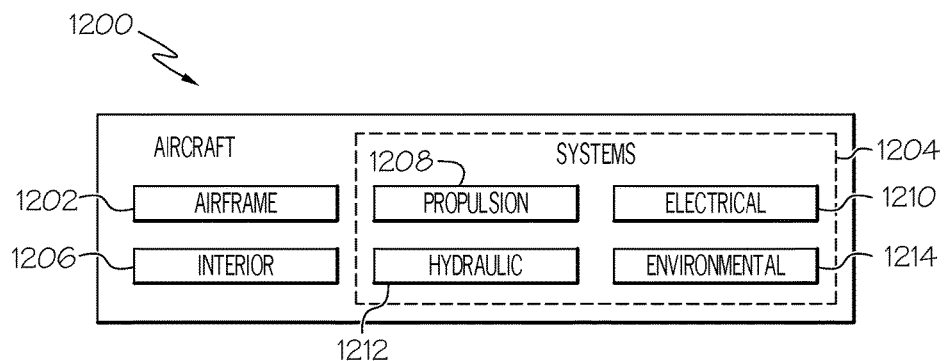
FIG. 15 is a schematic illustration of an aircraft.

Examples of embodiments or implementations described in the present disclosure may be described in the context of aircraft manufacturing and service method 1100 as shown in FIG. 14 and aircraft 1200 as shown in FIG. 15.

During pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of aircraft 1200 may take place. Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 15, aircraft 1200 produced by illustrative method 1100 may include airframe 1202 with a plurality of high-level systems 1204 and interior 1206. Examples of high-level systems 1204 include one or more of propulsion system 1208, electrical system 1210, hydraulic system 1212 and environmental system 1214. Any number of other systems may be included. Although an aerospace example is shown, the principles disclosed herein may be applied to other industries, such as the automotive industry, the marine industry, the construction industry or the like.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatus and methods, or combination thereof may be utilized during production stages (blocks 1108 and 1110), for example, by analyzing mechanical properties of 3D objects built an additive manufacturing process and/or providing such 3D objects having a desired mechanical property.

Similarly, one or more examples of the apparatus and methods, or a combination thereof, may be utilized, for example and without limitation, while aircraft 1200 is in service (block 1112) and during maintenance and service stage (block 1114).

Although various embodiments of the disclosed apparatus, method and program product have been shown and described, modifications may occur to those skilled in the art upon reading the specification. The present application includes such modifications and is limited only by the scope of the claims.

What is claimed is:

1. A computer implemented method comprising:
    generating a first simulated object layer representing a first object layer of a three-dimensional object to be build using an additive manufacturing system, said first simulated layer comprising first simulated roads representing a first road geometry of first roads of a material to be deposited by a dispensing head of said additive manufacturing system following a first tool path for building said first object layer;
    generating a second simulated object layer representing a second object layer of said three-dimensional object to be build using said additive manufacturing system, said second simulated layer comprising second simulated roads representing a second road geometry for second roads of said material to be deposited by said dispensing head following a second tool path for successively building said second object layer on said first object layer;
    calculating a nominal surface area of a simulated layer interface between said first simulated object layer and said second simulated object layer;
    calculating a contact surface area of a simulated road interface between said first simulated roads and said second simulated roads;
    calculating a percentage of said nominal surface area formed by said contact surface area;
    determining a predicted mechanical property of a layer interface between said first object layer and said second object layer based on a product of a material property of said material and said percentage;
    selectively moving said dispensing head along said first tool path while depositing said material to form said first roads, having said first road geometry, and build said first object layer using said additive manufacturing system;
    selectively moving said dispensing head along said second tool path while depositing said material to form said second roads, having said second road geometry, and successively build said second object layer on said first object layer using said additive manufacturing system; and
    forming said three-dimensional object having a mechanical property of said layer interface between said first object layer and said second object layer equivalent to said predicted mechanical property.

2. The method of claim 1 wherein:
    said first roads comprise first raster roads;
    said second roads comprise second raster roads;
    said first road geometry comprises at least one of first raster widths, first raster-to-raster gap widths, and first raster angles; and
    said second road geometry comprises at least one of second raster widths, second raster-to-raster gap widths, and second raster angles.

3. The method of claim 1 wherein said contact surface area is a total area of intersection between said first simulated roads and said second simulated roads at said simulated layer interface between said first simulated object layer and said second simulated object layer.

4. The method of claim 1 further comprising establishing said predicted mechanical property of said layer interface between said first simulated object layer and said second simulated object layer as an overall predicted mechanical property of said three-dimensional object.

5. The method of claim 4 further comprising:
    generating a three-dimensional model representing an exterior geometry of said three-dimensional object;
    slicing said three-dimensional model into model layers, a first one of said model layers defining a first exterior geometry of said first simulated layer and a second one of said model layers defining a second exterior geometry of said second simulated layer;
    providing first road geometry data and first tool path data to generate said first simulated roads defining a first interior geometry of said first simulated layer; and
    providing second road geometry data and second tool path data to generate said second simulated roads defining a second interior geometry of said second simulated layer.

6. The method of claim 4 further comprising:
    comparing said overall predicted mechanical property of said three-dimensional object to a desired mechanical property of said three-dimensional object; and
    upon a condition in which said overall predicted mechanical property of said three-dimensional object is less that said desired mechanical property of said three-dimensional object, modifying at least one of said first simulated roads and said second simulated roads to increase said percentage.

7. The method of claim 6 wherein modifying at least one of said first simulated roads and said second simulated roads comprises at least one of:
    providing at least one of first modified road geometry data and a first modified tool path to generate first modified simulated roads; and
    providing at least one of a second road geometry data and a second modified tool path to generate second modified simulated roads.

8. The method of claim 7 further comprising generating an output comprising at least one of said first modified road geometry, said first modified tool path, said second modified road geometry, and said second modified tool path to be used for building said three-dimensional object during said additive manufacturing process.

9. The method of claim 1 further comprising:
    generating a third simulated object layer representing a third object layer of said three-dimensional object, said third simulated layer comprising third simulated roads representing a third road geometry for third roads of said material to be deposited by said dispensing head following a third tool path for successively building said third object layer on said second object layer;
    calculating a second nominal surface area of a second simulated layer interface between said second simulated object layer and said third simulated object layer;
    calculating a second contact surface area of a second simulated road interface between said second simulated roads and said third simulated roads;
    calculating a second percentage of said second nominal surface area formed by said second contact surface area;

determining a second predicted mechanical property of a second layer interface between said second object layer and said third object layer based on a product of said material property of said material and said second percentage;

selectively moving said dispensing head along said third tool path while depositing said material to form said third roads, having said third road geometry, and successively build said third object layer on said second object layer using said additive manufacturing apparatus; and further forming said three-dimensional object having a second mechanical property of said second layer interface between said second object layer and said third object layer equivalent to said second predicted mechanical property.

10. The method of claim 9 further comprising:
comparing said predicted mechanical property of said layer interface between said first simulated object layer and said second simulated object layer and said second predicted mechanical property of said second layer interface between said second simulated object layer and said third simulated object layer; and establishing a lesser one of said predicted mechanical property of said layer interface and said second predicted mechanical property of said second layer interface as an overall predicted mechanical property of said three-dimensional object.

11. An apparatus comprising:
an additive manufacturing system comprising a dispensing head configured to dispense a material during an additive manufacturing process;
a processor; and
a non-transitory memory storing program code executable by said processor to perform steps comprising:
generating a first simulated object layer representing a first object layer of a three-dimensional object to be build using said additive manufacturing system, said first simulated layer comprising first simulated roads representing first roads of said material, having a first road geometry, to be deposited by said dispensing head following a first tool path for building said first object layer;
generating a second simulated object layer representing a second object layer of said three-dimensional object to be build using said additive manufacturing system, said second simulated layer comprising second simulated roads representing second roads of said material, having a second road geometry, to be deposited by said dispensing head following a second tool path for successively building said second object layer on said first object layer;
calculating a nominal surface area of a simulated layer interface between said first simulated object layer and said second simulated object layer;
calculating a contact surface area of a simulated road interface between said first simulated roads and said second simulated roads;
calculating a percentage of said nominal surface area formed by said contact surface area;
determining a predicted mechanical property of a layer interface between said first object layer and said second object layer based on a product of a material property of said material and said percentages;
selectively moving said dispensing head along said first tool path while depositing said material to form said first roads, having said first road geometry, and build said first object layer using said additive manufacturing system;
selectively moving said dispensing head along said second tool path while depositing said material to form said second roads, having said second road geometry, and successively build said second object layer on said first object layer using said additive manufacturing system; and
forming said three-dimensional object having a mechanical property of said layer interface between said first object layer and said second object layer equivalent to said predicted mechanical property.

12. The apparatus of claim 11 wherein:
said first roads comprise first raster roads;
said second roads comprise second raster roads;
said first road geometry comprises at least one of first raster widths, first raster-to-raster gap widths, and first raster angles; and
said second road geometry comprises at least one of second raster widths, second raster-to-raster gap widths, and second raster angles.

13. The apparatus of claim 11 wherein said contact surface area is a total area of intersection between said first simulated roads and said second simulated roads at said simulated layer interface between said first simulated object layer and said second simulated object layer.

14. The apparatus of claim 11 wherein said steps further comprise establishing said predicted mechanical property of said layer interface between said first simulated object layer and said second simulated object layer as an overall predicted mechanical property of said three-dimensional object.

15. The apparatus of claim 14 wherein said steps further comprise:
generating a three-dimensional model representing an exterior geometry of said three-dimensional object;
slicing said three-dimensional model into model layers, a first one of said model layers defining a first exterior geometry of said first simulated layer and a second one of said model layers defining a second exterior geometry of said second simulated layer;
providing first road geometry data and first tool path data to generate said first simulated roads defining a first interior geometry of said first simulated layer; and
providing second road geometry data and second tool path data to generate said second simulated roads defining a second interior geometry of said second simulated layer.

16. The apparatus of claim 14 wherein said steps further comprise:
comparing said overall predicted mechanical property of said three-dimensional object to a desired mechanical property of said three-dimensional object; and
upon a condition in which said overall predicted mechanical property of said three-dimensional object is less that said desired mechanical property of said three-dimensional object, modifying at least one of said first simulated roads and said second simulated roads to increase said percentage.

17. The apparatus of claim 16 wherein modifying at least one of said first simulated roads and said second simulated roads comprises at least one of:
providing at least one of first modified road geometry data and a first modified tool path to generate first modified simulated roads; and providing at least one of a second road geometry data and a second modified tool path to generate second modified simulated roads.

18. The apparatus of claim 17 wherein said steps further comprise generating an output comprising at least one of said first modified road geometry, said first modified tool path, said second modified road geometry, and said second modified tool path to be used for building said three-dimensional object during said additive manufacturing process.

19. The apparatus of claim 11 wherein said steps further comprise:
generating a third simulated object layer representing a third object layer of said three-dimensional object, said third simulated layer comprising third simulated roads representing third roads of said material, having a third road geometry, to be deposited by said dispensing head following a third tool path for successively building a third object layer on said second object layer;
calculating a second nominal surface area of a second simulated layer interface between said second simulated object layer and said third simulated object layer;
calculating a second contact surface area of a second simulated road interface between said second simulated roads and said third simulated roads;
calculating a second percentage of said second nominal surface area formed by said second contact surface area;
determining a second predicted mechanical property of a second layer interface between said second object layer and said third object layer based on a product of said material property of said material and said second percentage
selectively moving said dispensing head along said third tool path while depositing said material to form said third roads, having said third road geometry, and successively build said third object layer on said second object layer using said additive manufacturing system; and
further forming said three-dimensional object having a second mechanical property of said second layer interface between said second object layer and said third object layer equivalent to said second predicted mechanical property.

20. The apparatus of claim 19 wherein said steps further comprise:
comparing said predicted mechanical property of said layer interface between said first simulated object layer and said second simulated object layer and said second predicted mechanical property of said second layer interface between said second simulated object layer and said third simulated object layer; and
establishing a lesser one of said predicted mechanical property of said layer interface and said second predicted mechanical property of said second layer interface as an overall predicted mechanical property of said three-dimensional object.

21. A program product comprising a non-transitory computer readable storage medium storing program code executable by a computer and configured to:
receive a first road geometry for first roads of a material to be deposited by a dispensing head of an additive manufacturing system following a first tool path for successively building a first object layers of a three-dimensional object during an additive manufacturing process;
receive a second road geometry for second roads of said material to be deposited by said dispensing head following a second tool path for successively building a second object layer of said three-dimensional object on said first object layer;
generate a first simulated object layer representing said first object layer, said first simulated object layer comprising first simulated roads representing said first roads;
generate a second simulated object layer representing said second object layer, said second simulated object layer comprising second simulated roads representing said second roads;
calculate a nominal surface area of a simulated layer interface between said first simulated object layer and said second simulated object layer;
calculate a contact surface area of a simulated road interface between said first simulated roads and said second simulated roads;
calculate a percentage of said nominal surface area formed by said contact surface area;
determine a predicted mechanical property of a layer interface between said first object layer and said second object layer based on a product of a material property of said material and said percentage
selectively move said dispensing head along said first tool path while depositing said material to form said first roads, having said first road geometry, and build said first object layer using said additive manufacturing system;
selectively moving said dispensing head along said second tool path while depositing said material to form said second roads, having said second road geometry, and successively build said second object layer on said first object layer using said additive manufacturing system; and
forming said three-dimensional object with said additive manufacturing system having a mechanical property of said layer interface between said first object layer and said second object layer equivalent to said predicted mechanical property.

22. The program product of claim 21 wherein:
said first roads comprise first raster roads;
said second roads comprise second raster roads;
said first road geometry comprises at least one of first raster widths, first raster-to-raster gap widths, and first raster angles; and
said second road geometry comprises at least one of second raster widths, second raster-to-raster gap widths, and second raster angles.

23. The program product of claim 21 wherein said contact surface area is a total area of intersection between said first simulated roads and said second simulated roads at said simulated layer interface between said first simulated object layer and said second simulated object layer.

24. The program product of claim 21 wherein said program code is further configured to establish said predicted mechanical property of said layer interface said first simulated object layer and said second simulated object layer as an overall predicted mechanical property of said three-dimensional object.

25. The program product of claim 24 wherein said program code is further configured to:
generate a three-dimensional model representing an exterior geometry of said three-dimensional object;
slice said three-dimensional model into model layers, a first one of said model layers defining a first exterior geometry of said first simulated layer and a second one of said model layers defining a second exterior geometry of said second simulated layer;

provide first road geometry data and first tool path data to generate said first simulated roads defining a first interior geometry of said first simulated layer; and provide second road geometry data and second tool path data to generate said second simulated roads defining a second interior geometry of said second simulated layer.

26. The program product of claim 24 wherein said program code is further configured to:

compare said overall predicted mechanical property of said three-dimensional object to a desired mechanical property of said three-dimensional object; and upon a condition in which said overall predicted mechanical property of said three-dimensional object is less that said desired mechanical property of said three-dimensional object, modify at least one of said first simulated roads and said second simulated roads to increase said percentage.

27. The program product of claim 26 wherein said program code is further configured to:

provide at least one of first modified road geometry data and a first modified tool path to generate first modified simulated roads; and provide at least one of a second road geometry data and a second modified tool path to generate second modified simulated roads.

28. The program product of claim 27 wherein said program code is further configured to generate an output comprising at least one of said first modified road geometry, said first modified tool path, said second modified road geometry, and said second modified tool path to be used for building said three-dimensional object during said additive manufacturing process.

29. The program product of claim 21 wherein said program code is further configured to:

receive third road geometry for third roads of said material to be deposited by said dispensing head following a third tool path for successively building a third object layer of said three-dimensional object on said second object layer;

generate a third simulated object layer representing said third object layer, said third simulated object layer comprising third simulated roads representing said third roads;

calculate a second nominal surface area of a second simulated layer interface between said second simulated object layer and said third simulated object layer;

calculate a second contact surface area of a second simulated road interface between said second simulated roads and said third simulated roads;

calculate a second percentage of said second nominal surface area formed by said second contact surface area;

determine a second predicted mechanical property of a second layer interface between said second object layer and said third object layer based on a product of said material property of said material and said second percentage;

selectively move said dispensing head along said third tool path while depositing said material to form said third roads, having said third road geometry, and successively build said third object layer on said second object layer using said additive manufacturing system; and further form said three-dimensional object with said additive manufacturing system having a second mechanical property of said second layer interface between said second object layer and said third object layer equivalent to said second predicted mechanical property.

30. The program product of claim 29 wherein said program code is further configured to:

compare said predicted mechanical property of said layer interface between said first simulated object layer and said second simulated object layer and said second predicted mechanical property of said second layer interface between said second simulated object layer and said third simulated object layer; and establish a lesser one of said predicted mechanical property of said layer interface and said second predicted mechanical property of said second layer interface as an overall predicted mechanical property of said three-dimensional object.

* * * * *